(12) United States Patent
Park et al.

(10) Patent No.: US 10,631,054 B2
(45) Date of Patent: Apr. 21, 2020

(54) TERMINAL AND METHOD FOR CONTROLLING THE SAME

(71) Applicant: LG ELECTRONICS INC., Seoul (KR)

(72) Inventors: Mihyun Park, Seoul (KR); Hyunok Lee, Seoul (KR); Hongjo Shim, Seoul (KR); Mansoo Sin, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/788,734

(22) Filed: Oct. 19, 2017

(65) Prior Publication Data

US 2018/0124466 A1  May 3, 2018

(30) Foreign Application Priority Data

Nov. 2, 2016  (KR) .................. 10-2016-0144954

(51) Int. Cl.
*H04N 21/4728* (2011.01)
*G06T 11/80* (2006.01)
*G06F 3/0488* (2013.01)
*G06T 13/80* (2011.01)
*G06T 11/60* (2006.01)
(Continued)

(52) U.S. Cl.
CPC ....... *H04N 21/4728* (2013.01); *G06F 3/0487* (2013.01); *G06F 3/04845* (2013.01); *G06F 3/04847* (2013.01); *G06F 3/04883* (2013.01); *G06T 11/60* (2013.01); *G06T 11/80* (2013.01); *G06T 13/205* (2013.01); *G06T 13/80* (2013.01); *H04N 5/23245* (2013.01); *H04N 5/23293* (2013.01); *H04N 21/41407* (2013.01); *H04N 21/42202* (2013.01); *H04N 21/47217* (2013.01); *G06T 2215/16* (2013.01); *H04N 21/4325* (2013.01); *H04N 21/44008* (2013.01)

(58) Field of Classification Search
None
See application file for complete search history.

(56) References Cited

U.S. PATENT DOCUMENTS 9,230,355 B1    1/2016  Ahuja et al.
2008/0084400 A1*  4/2008  Rosenberg ............ G06F 1/1626
                                                                    345/173
(Continued)

FOREIGN PATENT DOCUMENTS

EP         2759909          7/2014
KR      1020110042856       4/2011
(Continued)

OTHER PUBLICATIONS

European Patent Office Application Serial No. 17198172.3, Search Report dated Apr. 30, 2018, 13 pages.
(Continued)

*Primary Examiner* — Girumsew Wendmagegn
(74) *Attorney, Agent, or Firm* — Lee, Hong, Degerman, Kang & Waimey

(57) ABSTRACT

Disclosed are a terminal and controlling method thereof. The present invention includes displaying a content, obtaining an input to at least one partial region of the displayed content, and outputting a video having the at least one partial region of the content move therein in a manner corresponding to the obtained input.

18 Claims, 16 Drawing Sheets

(51) Int. Cl.
   *G06F 3/0484*  (2013.01)
   *G06F 3/0487*  (2013.01)
   *G06T 13/20*  (2011.01)
   *H04N 21/422*  (2011.01)
   *H04N 5/232*  (2006.01)
   *H04N 21/414*  (2011.01)
   *H04N 21/472*  (2011.01)
   *H04N 21/432*  (2011.01)
   *H04N 21/44*  (2011.01)

(56) References Cited

U.S. PATENT DOCUMENTS

| | | | |
|---|---|---|---|
| 2013/0079386 A1* | 3/2013 | Krohn | C12Q 1/6886 514/44 A |
| 2013/0080895 A1* | 3/2013 | Rossman | G06F 3/04883 715/720 |
| 2014/0028601 A1* | 1/2014 | Moore | G06F 3/04883 345/173 |
| 2014/0095996 A1* | 4/2014 | Hogben | G06F 17/30017 715/716 |
| 2015/0042663 A1 | 2/2015 | Mandel et al. | |
| 2015/0264425 A1 | 9/2015 | Heinz, II et al. | |

FOREIGN PATENT DOCUMENTS

| | | |
|---|---|---|
| KR | 101655078 | 9/2016 |
| WO | 2016098939 | 6/2016 |

OTHER PUBLICATIONS

European Patent Office Application Serial No. 17198172.3, Search Report dated Feb. 2, 2018, 12 pages.

* cited by examiner (a) play forward, ×2

(b) play backward, ×0.8

(a) Recognized body frame structure (b) Movable action (a)

(b)

(a) Inelastic model information applied  (b) Elastic model information applied

TERMINAL AND METHOD FOR CONTROLLING THE SAME

Pursuant to 35 U.S.C. § 119(a), this application claims the benefit of earlier filing date and right of priority to Korean Patent Application No. 10-2016-0144954, filed on Nov. 2, 2016, the contents of which are all hereby incorporated by reference herein in its entirety.

BACKGROUND OF THE INVENTION

Field of the Invention

The present invention relates to a terminal, and more particularly, to a terminal and method for controlling the same. Although the present invention is suitable for a wide scope of applications, it is particularly suitable for playing contents.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Recently, videos or images are frequently shot using a terminal. Owing to the improved performance of the terminal, a user can obtain a video or image of high quality or definition through the photographing using the terminal. Regarding the video or image shooting, a difference between a terminal and a camera tends to be reduced. In aspect of a video shooting function only, the terminal and the camera can be regarded as the same.

Various functions are added to the photographing that uses a terminal. For example, a function of shooting a video during a predetermined time before or after pressing a shot button together with an image can be provided. Thus, the taken image and video are provided as a content of a new type for sharing or remembering the memory of a user.

Recently, as a content of a new type, in which a prescribed object moves in a still image, is provided, a distinction between a still image and a moving image becomes insignificant.

However, since a terminal simply outputs or plays the photographed images or videos, the terminal provides the above-mentioned contents of various types in limited forms only.

SUMMARY OF THE INVENTION

One technical task of the present invention is to provide an image in which at least one partial region of a content moves according to user intention.

Another technical task of the present invention is to provide an image in which at least one partial region of a content moves according to an ambient environment of a terminal.

Further technical task of the present invention is to provide an image in which a selected object moves using a motion model information for the selected object.

Technical tasks obtainable from the present invention are non-limited by the above-mentioned technical tasks. And, other unmentioned technical tasks can be clearly understood from the following description by those having ordinary skill in the technical field to which the present invention pertains.

To achieve these objects and other advantages and in accordance with the purpose of the invention, as embodied and broadly described herein, a terminal according to one embodiment of the present invention may include a display unit displaying a content and a controller configured to obtain an input to at least one partial region of the content displayed on the display unit and control the display unit to output a video having the at least one partial region of the content move therein in a manner corresponding to the obtained input.

The controller may control the display unit to output the video having the at least one partial region of the content move therein according to at least one of a play direction and a play speed corresponding to the obtained input.

If the obtained input is a first direction, the controller may play the video having at least one portion of the content move therein forward. If the obtained input is a second direction, the controller may play the video having the at least one portion of the content move therein backward.

The controller may control the display unit to output a video in which a region corresponding to the obtained input in a whole region of the content moves.

The controller may recognize an object corresponding to the obtained input, obtain motion model information corresponding to the recognized object, and control the display unit to output a video having the recognized object move therein based on the obtained motion model information.

The controller may obtain an input of selecting the motion model information corresponding to the recognized object from a plurality of motion model informations and obtain the selected motion model information.

If the recognized object is a prescribed body part, the controller may recognize a frame structure of a body included in the content and control the display unit to output a video, in which at least one portion of the recognized body moves, based on the recognized frame structure.

The controller may determine a movable region for moving at least one portion of the recognized body based on the recognized frame structure and control the display unit to output a video in which the at least one portion of the recognized body moves within the determined movable region.

The controller may obtain ambient environment information on an ambience environment of the terminal and control the display unit to output a video having at least one partial region of the content move therein based on the obtained ambient environment information.

The terminal may further include a memory and the controller may save the outputted moving video to the memory.

In another aspect of the present invention, a method of controlling a terminal according to one embodiment of the present invention may include displaying a content, obtaining an input to at least one partial region of the displayed content, and outputting a video having the at least one partial region of the content move therein in a manner corresponding to the obtained input.

Accordingly, embodiments of the present invention provide various effects and/or features.

First of all, the present invention provides various moving images matching user's intention for a content.

Secondly, the present invention provides a video in which a partial region moves according to an ambient environment of a terminal, thereby providing a realistic video.

Thirdly, the present invention provides a video in which a selected object moves based on motion model information for the selected object, thereby providing a video similar to a real motion.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
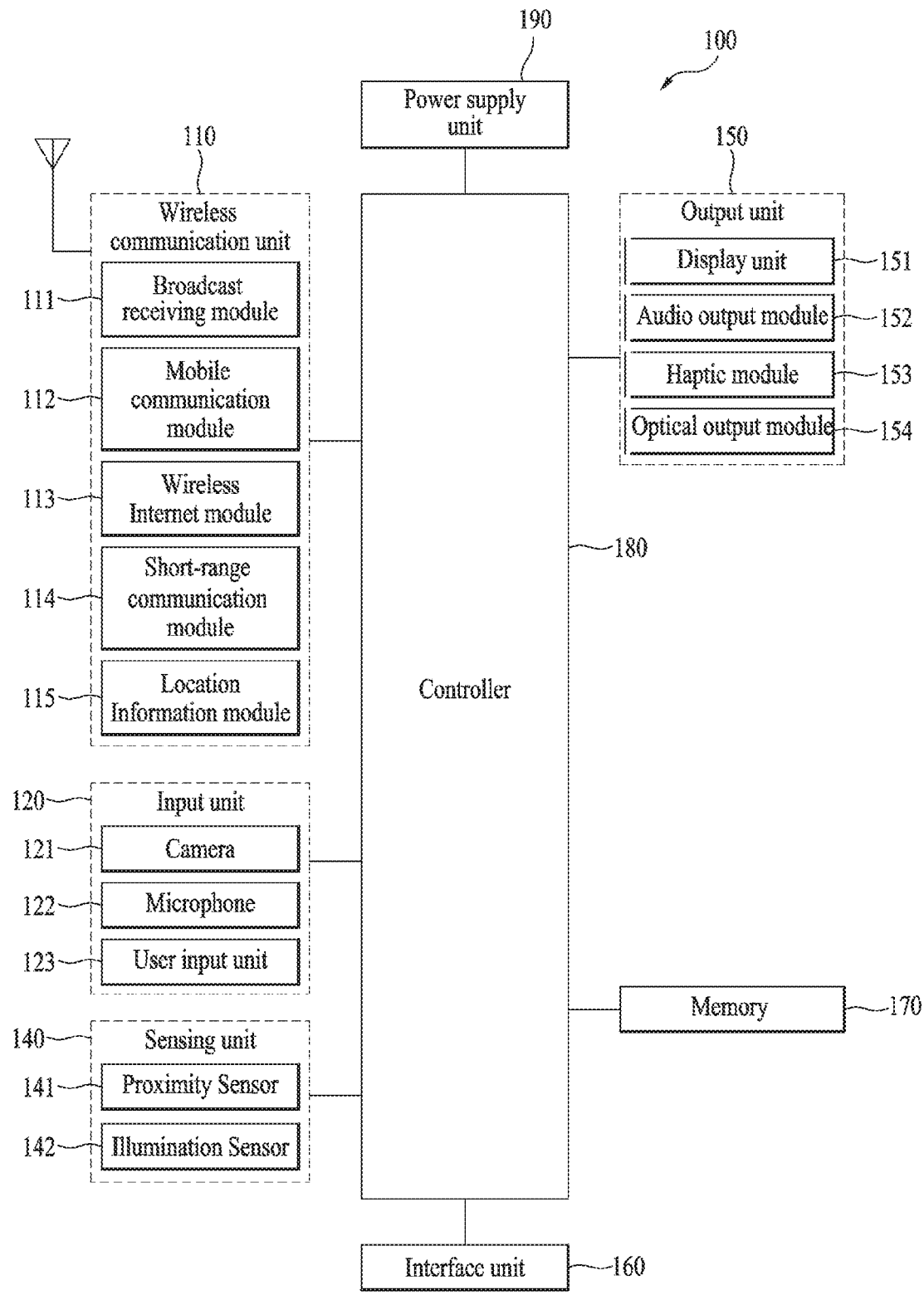
FIG. 1A is a block diagram to describe a terminal related to the present invention.
Figure 1B:
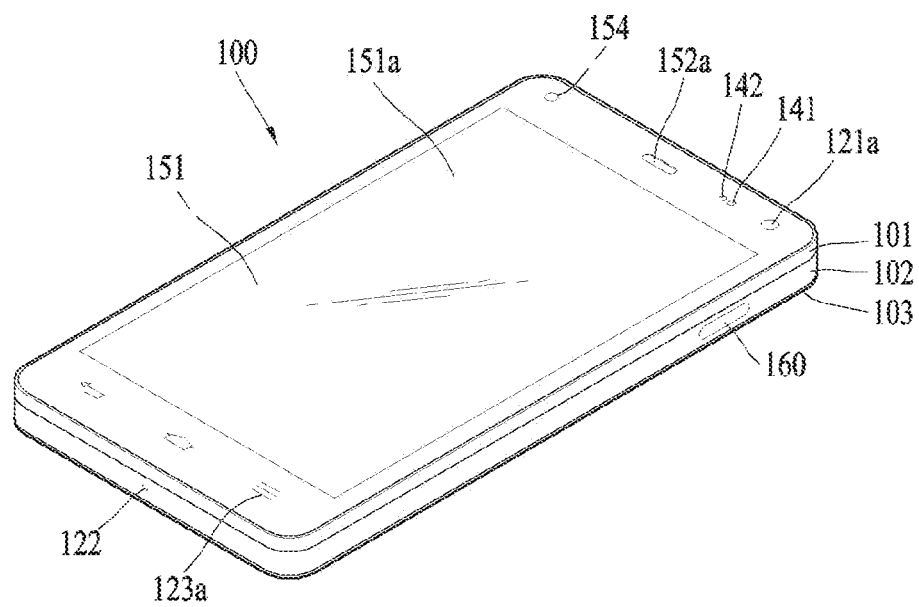
FIG. 1B and FIG. 1C are diagrams for the concept of one example of a terminal related to the present invention in different views, respectively.
Figure 1C:
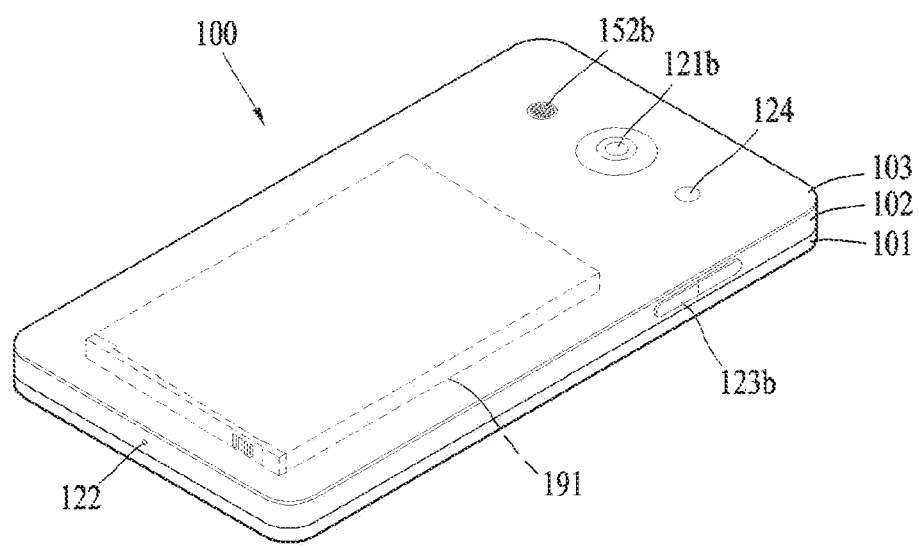

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an A/V input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel.

The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the wireless internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The A/V input unit 120 may be configured to permit various types of input to the mobile terminal 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121b may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear cover 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

When an image is shot through the camera 121, the terminal 100 according to various embodiments of the present invention can shoot a moving picture during a predetermined time before or after shooting the image as well. Moreover, the terminal 100 may shoot a moving picture from a predetermined time before the image photographing to a predetermined time after the image photographing as well. For one embodiment, when an image is shot through the camera 121, the terminal 100 can simultaneously shoot a moving picture amounting to the predetermined time and save the image and the moving picture together. For another embodiment, when an image is shot through the camera 121, the terminal can save images consecutively shot for the predetermined time. If the consecutively shot images are outputted consecutively, they bring the same effect of a moving picture. Hence, the consecutively shots image may correspond to the moving picture. Thus, the terminal 100 can save the moving picture before/after the image shoot together with the shot image. And, the terminal 100 can output and play the moving picture related to the shot image. For example, when the terminal 100 outputs the shot image, the terminal 100 can play the shot moving picture. For another example, if the shot image is selected, the terminal 100 can play the shot moving picture.

When the terminal 100 according to the various embodiments outputs a content, it can play a moving picture corresponding to the content. For example, when the terminal 100 outputs a shot image, the terminal 100 plays a shot moving picture and then outputs the shot image. Subsequently, the terminal 100 obtains an input to the shot image and is then able to play a video, in which at least one partial region of the image moves, in response to the obtained input. In this case, the video, in which at least one partial region of the image moves, may include a video played based on the video shot together with the shot image or a moving picture created based on the shot image. Moreover, based on ambient environment information on an ambient environment of the terminal 100, the terminal 100 may play a video in which at least one partial region contained in an outputted content moves in response to the ambient environment. Moreover, based on motion model information of an object contained in a content, the terminal 100 may play a video in which the object contained in the content moves.

Meanwhile, a content may include various contents that can be saved to, outputted from, and played by the terminal 100. For example, the content may include a text, a voice, a sound, an image, a video and the like. For clarity, the following description is made with reference to an image and a video, as described above, various contents are applicable.

Figure 2:
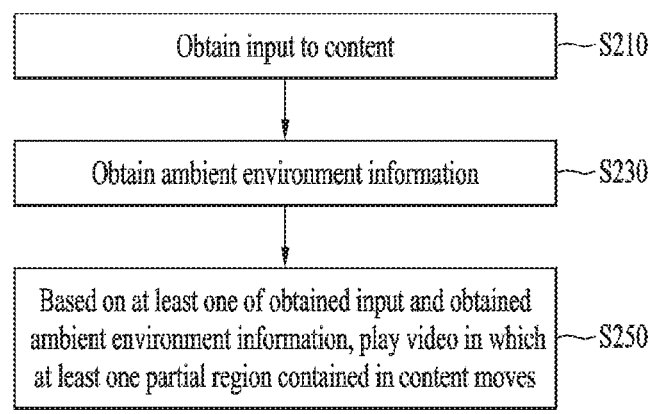
FIG. 2 is a flowchart for a method of operating a terminal according to various embodiments of the present invention.

FIG. 2 is a flowchart for a method of operating a terminal according to various embodiments of the present invention.

Referring to FIG. 2, the terminal 100 may obtain an input to a content [S210].

For example, the controller 180 of the terminal 100 can obtain various inputs related to the content. For one embodiment, the controller 180 may obtain at least one of an input for selecting a content displayed on the display unit 151, an input for outputting a content to the display unit 151, and an input of selecting a prescribed region of a displayed content.

The controller 180 of the terminal 100 may obtain the input to the content through the aforementioned touch input or may obtain an input to a physical key, a button or the like provided to the terminal 100. Moreover, the controller 180 may obtain an input to a content from an external device connected to the terminal 100.

The terminal 100 may obtain ambient environment information [S230].

The terminal 100 may obtain the ambient environment information on an ambient environment of the terminal 100. Herein, the ambient environment information may include such natural environmental information of an ambience of the terminal as current location, time, temperature, wind, brightness, humidity, light source location and the like and may also include such ambience information as user location around the terminal, eyes, sound direction and the like. The terminal 100 may obtain the ambient environment information through various components included in the terminal 100. For example, the controller 180 may obtain the aforementioned ambient environment information based on the sensing value sensed by the sensing unit 140, and may also obtain ambient environment information based on video and sound obtained through the camera 121, the microphone 122 and the like. And, the terminal 100 may receive ambient environment information from a server (not shown) or external device (not shown) communication-connected to the terminal 100.

The terminal 100 may play a video in which at least one partial region contained in the content moves based on at least one of the obtained input and the obtained ambient environment information [S250].

For example, the controller 180 of the terminal 100 can play a video in which a region corresponding to an input obtained from a whole region of the content moves only. For one embodiment, the controller 180 can play a video in which a region corresponding to an input obtained from a whole region of a moving picture moves only. For another embodiment, the controller 180 may play a video in which the rest of a moving picture except a region corresponding to an input obtained from a whole region of the moving picture moves.

For another example, the controller 180 of the terminal 100 can play a video in which a region selected from a whole region of the content moves to corresponding to an obtained input. For one embodiment, the controller 180 can play a video in which a region selected from an image or moving picture moves to correspond to an obtained input.

For further example, the controller 180 of the terminal 100 can play a moving image contained in the content in response to an obtained input. For one embodiment, the controller 180 can play a play direction of a moving image contained in the content forward or backward. For another embodiment, the controller 180 can play a play speed of a moving image contained in the content at a play speed corresponding to an obtained input.

In this case, the moving image contained in the content may include a moving picture or a plurality of images stored together with the content. For example, the moving image contained in the content may include a moving picture or a plurality of images shot together in photographing an image.

Based on the obtained ambient environment information, the controller 180 of the terminal 100 may play the video in which at least one partial region contained in the content moves. For example, based on user location information contained in the obtained ambient environment information, the controller 180 can play a video in which at least one partial region included in the obtained ambient environment information moves in a user direction. For another example, based on wind strength information included in the obtained ambient environment information, the controller 180 can play a video in which at least one partial region contained in the content moves to correspond to wind strength. For further example, based on light source location information included in the obtained ambient environment information, the controller 180 can play a video in which a light source effect of at least one partial region contained in the content moves according to a light source location.

Based on the obtained input and ambient environment information, the terminal 100 can play the video in which the at least one partial region contained in the content moves. Hence, based on the obtained input and ambient environment information, the terminal 100 may play a video in which at least one partial region contained in the content moves. For example, the controller 180 can play a moving image to correspond to the obtained ambient environment information and the obtained input. And, the terminal 100 may save the played moving image to the memory 180 or send it to save to an external server or device.

In the following, a detailed embodiment for the aforementioned operation of the present invention is described in detail.

Figure 3:
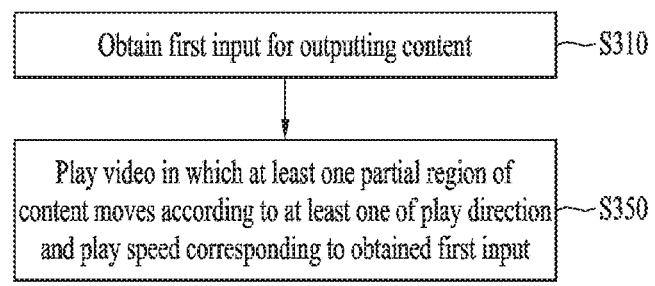
FIG. 3 is a flowchart for a video play operation in response to an obtained input according to various embodiments of the present invention.

FIG. 3 is a flowchart for a video play operation in response to an obtained input according to various embodiments of the present invention.

Referring to FIG. 3, the terminal 100 may obtain a first input to output a content [S310].

For example, the controller 180 of the terminal 100 can obtain an input of selecting at least one content from a content list as a first input for outputting a content. For another example, the controller 180 of the terminal 100 can obtain an input for outputting a previous or next content in the course of outputting a content as a first input for outputting a content. For further example, the controller 180 of the terminal 100 can obtain an input for adjusting a content output for a currently outputted content as a first input for outputting a content. Besides, the terminal 100 may obtain various inputs for contents as a first input for outputting a content.

The terminal 100 may play a video in which at least one partial region of the content moves according to at least one of a play direction and a play speed corresponding to the obtained first input [S350].

For example, the controller 180 of the terminal 100 may play a video, in which at least one partial region of a content moves, in a play direction corresponding to a direction of the obtained first input. For one embodiment, if a direction of the obtained first input is a first direction, the controller 180 can play a video, in which at least one partial region of a content moves, forward. For another embodiment, if a direction of the obtained first input is a second direction, the controller 180 can play a video, in which at least one partial region of a content moves, backward.

For another example, the controller 180 of the terminal 100 may play a video, in which at least one partial region of a content moves, at a play speed corresponding to an input level of the obtained first input. In this case, the input level may include an input strength, an input length, an input time, and/or an input count or mean an input value. For one embodiment, the controller 180 can play a video, in which at least one partial region of a content moves, at a play speed corresponding to an input length of the obtained first input, e.g., a drag length of a touch input. For another embodiment, the controller 180 can play a video, in which at least one partial region of a content moves, at a play speed corresponding to an input strength of the obtained first input, e.g., a touch strength of a touch input.

Moreover, the terminal 100 may play a video, in which at least one partial region of a content moves, according to a play direction and a play speed corresponding to the obtained first input.

Meanwhile, according to a video play, the terminal may output a video, in which at least one partial region moves, to the display unit 151 of the terminal 100 and output an audio corresponding to the outputted video through the audio output module 152. And, the terminal 100 may deliver a signal for a played video to an external device. Hence, having received the delivered signal, the external device may output a video in which at least one partial region of a content moves. The terminal 100 may save the outputted video, in which at least one partial region of a content moves, to the memory 180 or send the video to save to an external server or device.

Details of embodiments are described with reference to FIGS. 4 to 6.

Figure 4:
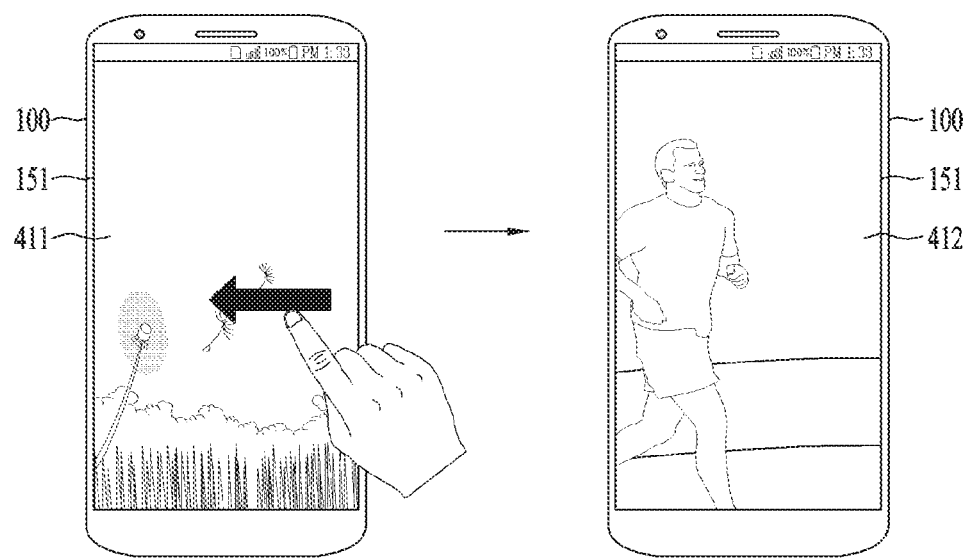
FIG. 4 and FIG. 5 are diagrams showing one example of a play direction corresponding to a first input according to various embodiments of the present invention.
Figure 5:
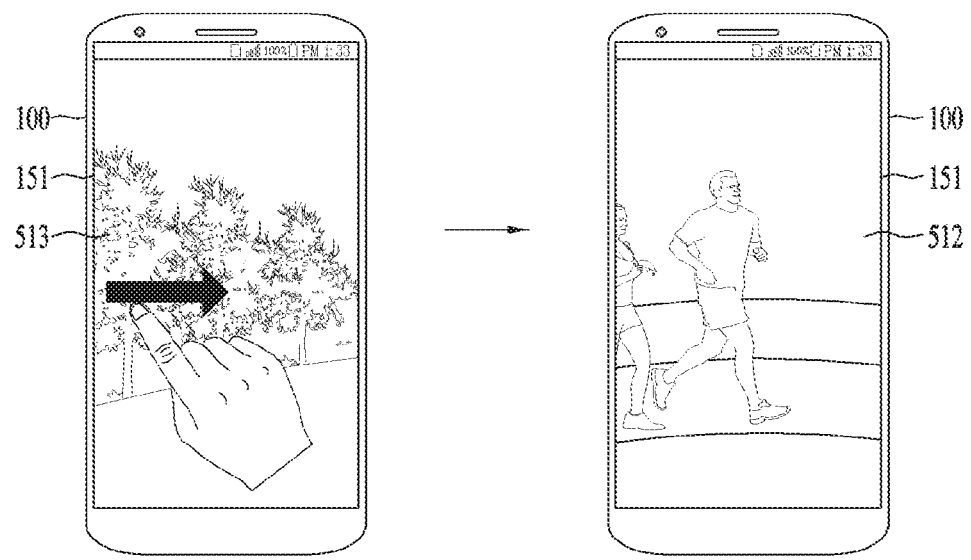

FIG. 4 and FIG. 5 are diagrams showing one example of a play direction corresponding to a first input according to various embodiments of the present invention.

Referring to FIG. 4, the controller 180 of the terminal 100 may display a first content 411 on the display unit 151 of the terminal 100. The controller 180 may obtain a first input for outputting a second content 412. For example, the controller 180 can obtain an input of flicking in a left direction as a first input. Herein, the input of flicking in the left direction may include an input for displaying a next content. If obtaining the first input, the controller 180 can display the second content 412 on the display unit 151. Herein, the second content 412 may include a moving picture or a content having a moving picture stored together with an image in shooting. The controller 180 can play a video, in which at least one partial region of the second content 412 moves, in a play direction corresponding to the first input and display the played video on the display unit 151. For example, the controller 180 may play a video, in which at least one partial region of the second content 412 moves, in a forward direction that is a play direction corresponding to an input of flicking in a left direction and display the forward played video on the display unit 151.

Referring to FIG. 5, the controller 180 of the terminal 100 may display a third content 513 on the display unit 151. The controller 180 may obtain a first input for outputting a second content 512. For example, the controller 180 can obtain an input of flicking in a right direction as a second input. Herein, the input of flicking in the right direction may include an input for displaying a previous content. If obtaining the first input, the controller 180 can display the second content 512 on the display unit 151. Herein, the second content 512 may include a moving picture or a content having a moving picture stored together with an image in shooting. The controller 180 can play a video, in which at least one partial region of the second content 512 moves, in a play direction corresponding to the first input and display the played video on the display unit 151. For example, the controller 180 may play a video, in which at least one partial region of the second content 512 moves, in a backward direction that is a play direction corresponding to an input of flicking in a right direction and display the backward played video on the display unit 151.

Figure 6:
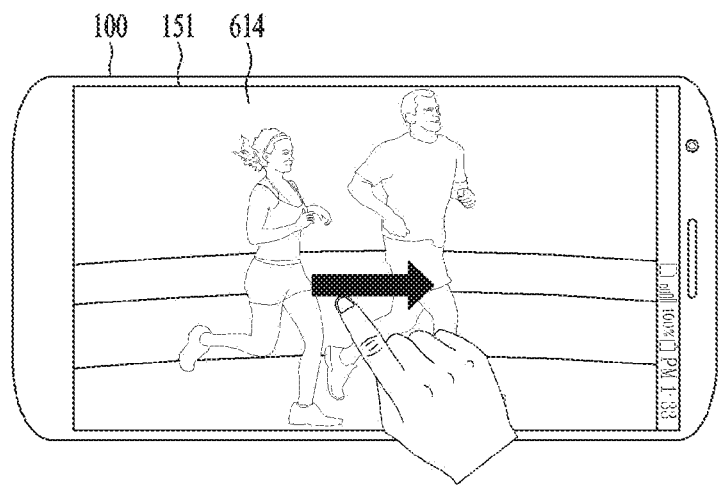
FIG. 6 is a diagram showing one example of a play speed and a ply direction corresponding to a first input according to various embodiments of the present invention.
Figure 6:
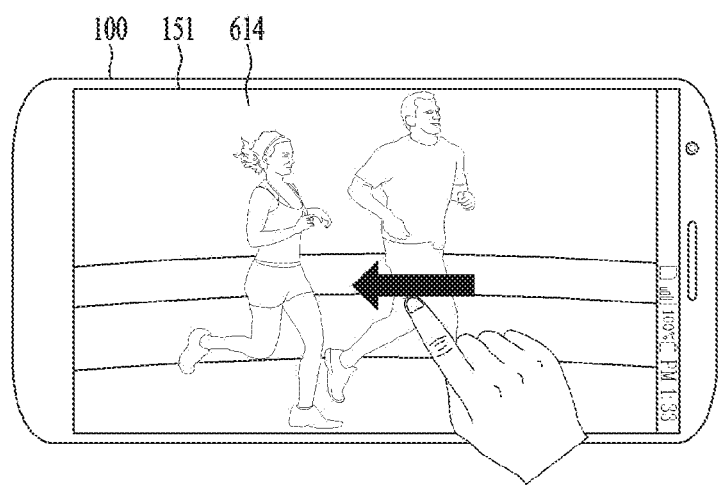

FIG. 6 is a diagram showing one example of a play speed and a play direction corresponding to a first input according to various embodiments of the present invention.

Referring to FIG. 6 (a), the controller 180 of the terminal 100 may display a fourth content 614, which is a moving picture or an image having at least one partial region move therein, on the display unit 151 of the terminal 100. Herein, the fourth content 614 may include a moving picture or a content having an image and a moving picture saved together in shooting. The controller 180 may obtain a first input to the outputted fourth content 614. For example, the controller 180 may obtain an input of swiping in a right direction. The controller 180 can play the fourth content 614 according to a play direction and a play speed corresponding to the obtained input. For example, in response to an input of swiping in a right direction by a first distance, the controller 180 can play the fourth content 614 at 2x-speed forward.

Referring to FIG. 6 (b), the controller 180 of the terminal 100 may display a fourth content 614, which is a moving picture or an image having at least one partial region move therein, on the display unit 151 of the terminal 100. Herein, the fourth content 614 may include a moving picture or a content having an image and a moving picture saved together in shooting. The controller 180 may obtain a first input to the outputted fourth content 614. For example, the controller 180 may obtain an input of swiping in a left direction. The controller 180 can play the fourth content 614 according to a play direction and a play speed corresponding to the obtained input. For example, in response to an input of swiping in a left direction by a second distance, the controller 180 can play the fourth content 614 at 0.8x-speed backward. Herein, the second distance may be shorter than the first distance.

Thus, the terminal 100 can play a video, in which at least one partial region of a content moves, according to at least one of a play speed and a play direction corresponding to an input to the content.

Figure 7:
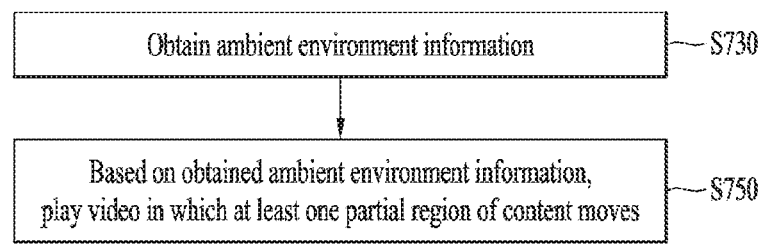
FIG. 7 is a flowchart for a video play operation in response to ambient environment information according to various embodiments of the present invention.

FIG. 7 is a flowchart for a video play operation in response to ambient environment information according to various embodiments of the present invention.

Referring to FIG. 7, the terminal 100 may obtain ambient environment information on an ambient environment of the terminal 100 [S730].

The terminal 100 may obtain the ambient environment information through various components included in the terminal 100. And, the terminal 100 may obtain ambient environment information from a server (not shown) or an external device (not shown). Herein, the ambient environment information may include such natural environmental information of an ambience of the terminal as current location, time, temperature, wind, brightness, humidity, light source location and the like and may also include such ambience information as user location around the terminal, eyes, sound direction and the like. Since the description of obtaining the ambient environment information of the terminal 100 is already made, details shall be omitted.

Based on the obtained ambient environment information, the terminal 100 can play a video in which at least one partial region of a content moves [S750].

For example, based on the obtained ambient environment information, the controller 180 of the terminal 100 can play the video in which at least one partial region contained in the content moves.

For example, according to the obtained ambient environment information, the controller 180 can play a video in which at least one partial region of a content moves. For one embodiment, based on user location information included in the obtained ambient environment information, the controller 180 can play a video in which at least one partial region included in a content faces a user direction. For another embodiment, based on wind information included in the obtained ambient environment information, the controller 180 can play a video in which at least one partial region included in a content is swayed by wind. For further embodiment, based on light source location information included in the obtained ambient environment information, the controller 180 can play a video in which a location of a shadow of at least one partial region included in a content moves according to a light source location.

Meanwhile, according to a video play, the terminal may output a video, in which at least one partial region moves, to the display unit 151 of the terminal 100 or output an audio corresponding to the outputted video through the audio output module 152. And, the terminal 100 may deliver a signal for a played video to an external device. Hence, having received the delivered signal, the external device may output a video in which at least one partial region of a content moves. The terminal 100 may save the outputted a video, in which at least one partial region of a content moves, to the memory 180 or send the video to save to an external server or device.

Details of embodiments are described with reference to FIGS. 8 to 10.

Figure 8:
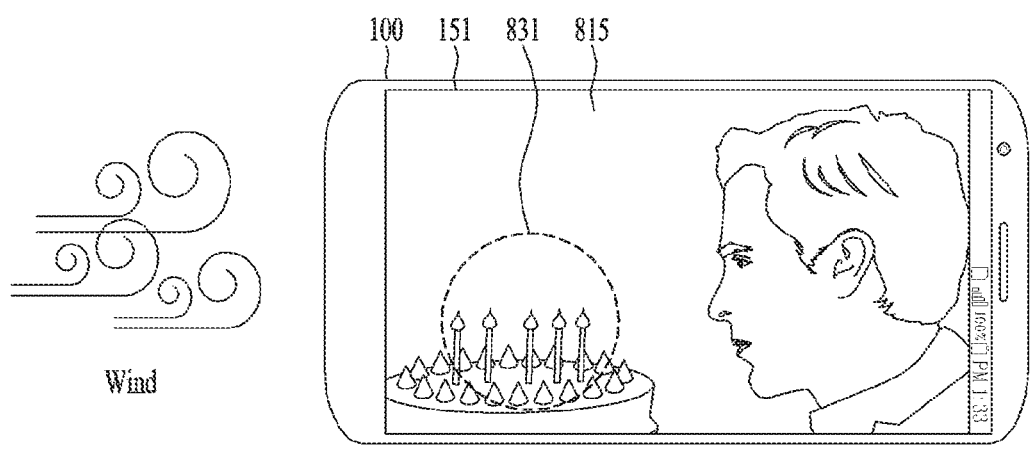
FIGS. 8 to 10 are diagrams showing examples of a video moving in response to ambient environment information according to various embodiments of the present invention.
Figure 9:
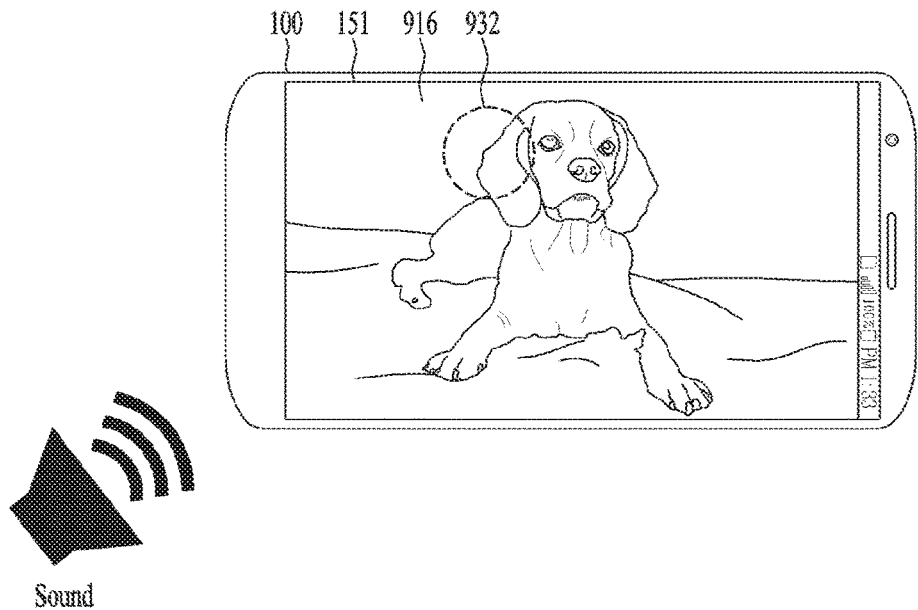
Figure 10:
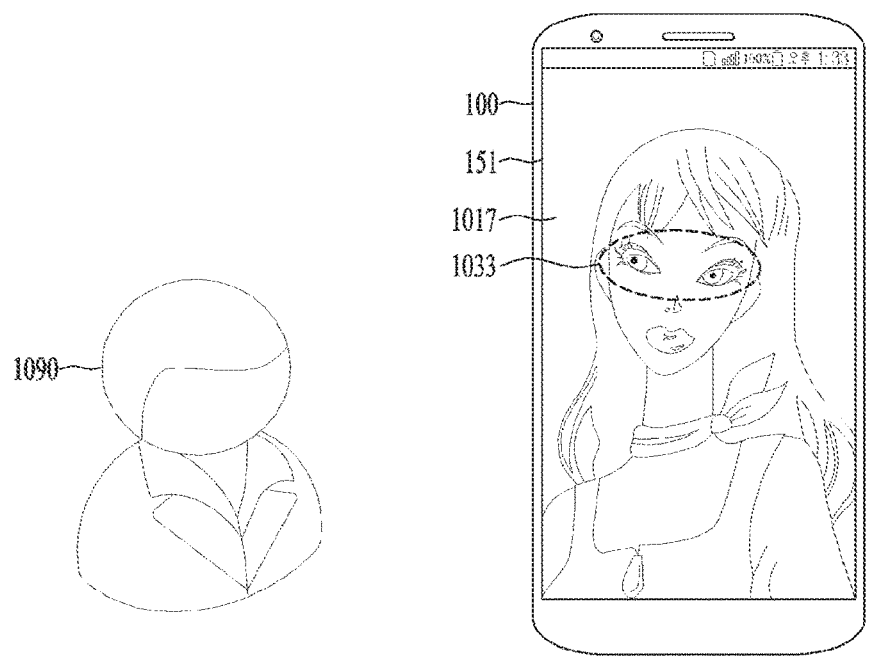

FIGS. 8 to 10 are diagrams showing examples of a video moving in response to ambient environment information according to various embodiments of the present invention.

Referring to FIG. 8, the terminal 100 can output an image 815 containing a candle 831 on the display unit 151. The terminal 100 can sense a wind around the terminal through the sensing unit 140. And, the terminal 100 may sense an input of blowing wind with 'puffing' through the microphone 122. If sensing the wind around the terminal or the input of blowing wind, the terminal 100 can play a video in which the candle 831 contained in the image 815 sways. For example, the controller 180 can play the video in which the candle 831 sways only in the displayed image 915. Moreover, the controller 180 may play a video in which the candle 831 sways to correspond to a strength of the sensed wind or a strength of the wind blowing input. Hence, if the strength of the sensed wind or the strength of the wind blowing input increases higher, the controller 180 can play a video in which the candle 831 sways more greatly. Moreover, if the strength of the sensed wind or the strength of the wind blowing input is equal to or greater than a predetermined reference, the controller 180 may play a video in which the candle 831 is blown out. Thus, the terminal 100 can sense the ambient environment information around the terminal like wind and play a video corresponding to the sensed ambient environment information.

Referring to FIG. 9, the terminal 100 displays an image 916 containing a dog on the display unit 151. The terminal 100 obtains sound around the terminal through the microphone 122. For example, the terminal 100 can obtain sound through a plurality of the microphones 122 and determine a direction of the obtained sound. If sensing the sound around the terminal, the terminal 100 can play a video in which an ear 932 of the dog contained in the displayed image 100 moves. For example, the controller 180 can play a video in which the dog's ear 932 moves in a sound sensed direction. Moreover, the controller 180 can differentiate a moving level of the dog's ear 932 to correspond to a size of the sensed sound. For example, if the sound of the sensed sound increases higher, the controller 100 can play a video in which the dog's ear 932 moves more in the sound sensed direction. Thus, the terminal 100 can sense the ambient environment information around the terminal like sound and play a video corresponding to the sensed ambient environment information.

Referring to FIG. 10, the terminal 100 displays an image 1017 containing a human face on the display unit 151. The terminal 100 obtains a video around the terminal through the camera 121. The controller 180 can recognize a user 1090 from the obtained video and determine a location of the user. The terminal 100 can play a video in which eyes 1033 contained in the displayed image 1017 move toward the determined user location. The terminal 100 may display an image in which the eyes 1033 contained in the displayed image 1017 face the determined user location. Thus, the terminal 100 can sense the ambient environment information around the terminal like user location and play a video corresponding to the sensed ambient environment information.

The terminal 100 according to various embodiments may play a video in which a partial region in a whole region of a content moves only. For example, according to an obtained input, the terminal 100 can play a video in which a partial region in a whole region of a content moves only. This is described with reference to FIGS. 11 to 13.

Figure 11:
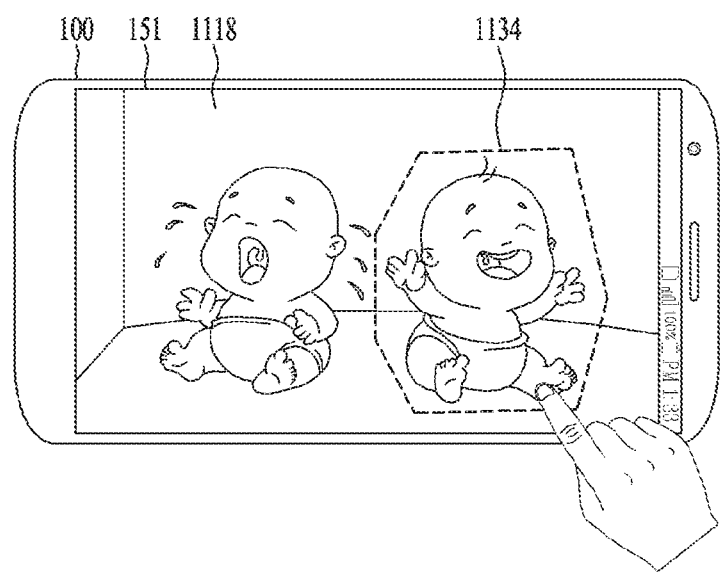
FIGS. 11 to 13 are diagrams showing examples of a video in which a partial region moves only in response to an obtained input according to various embodiments of the present invention.
Figure 12:
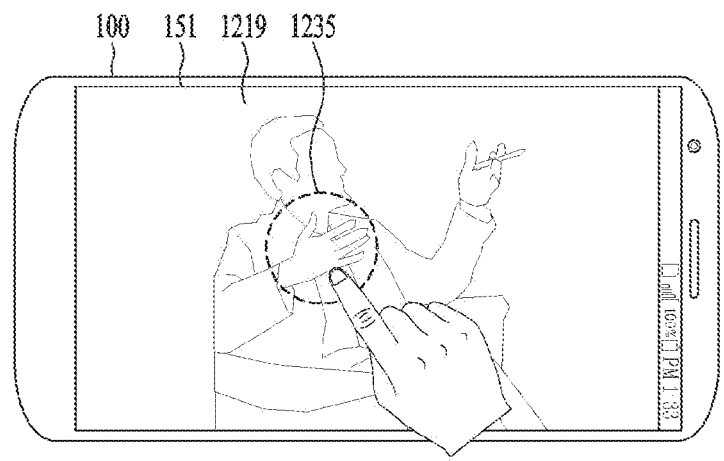
Figure 12:
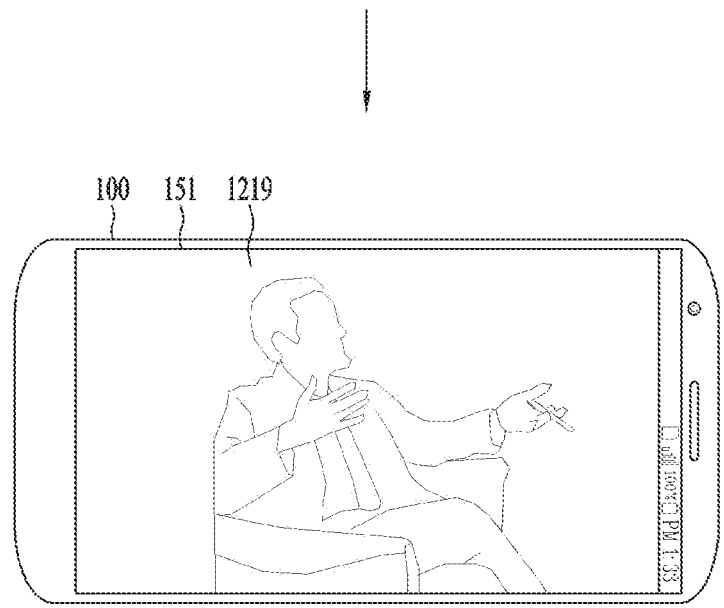
Figure 13:
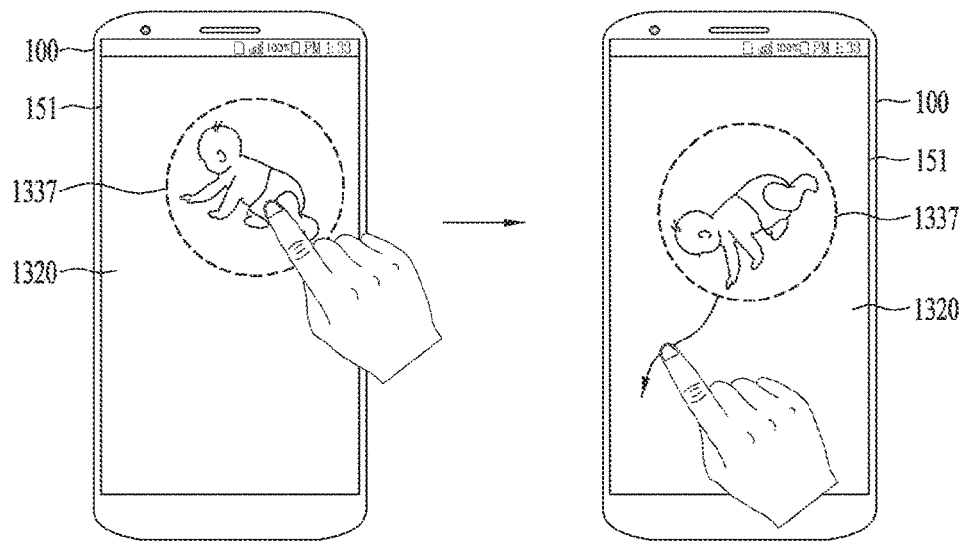

FIGS. 11 to 13 are diagrams showing examples of a video in which a partial region moves only in response to an obtained input according to various embodiments of the present invention.

Referring to FIG. 11, the terminal 100 can display a video 1118 containing two babies on the display unit 151. The video 1118 displayed on the terminal 100 may include a video in which both of the two babies move. The terminal 100 may obtain an input of selecting one of the displayed two babies. The terminal 100 can display a region indicator 1134 corresponding to the single baby corresponding to the obtained input. The controller 180 can recognize the baby corresponding to the obtained input and play a video in which the recognized baby moves only. Thus, based on the video having both of the babies move therein, the terminal 100 can play the video in which the selected baby moves only.

Referring to FIG. 12, the terminal 100 can display a video 1219, in which a single person simultaneously shakes both hands, on the display unit 151. The terminal 100 can obtain an input of selecting the right hand from the displayed video 1219. The terminal 100 can display a region indicator 1235 corresponding to the right hand that is an object corresponding to the obtained input. The controller 180 can recognize the right hand corresponding to the obtained input and play a video in which the recognized right hand moves only. Thus, based on the video having both of the hands move therein, the terminal 100 can play the video in which the selected right hand moves only.

Referring to FIG. 13, the terminal 100 can display a video 1320, in which a baby crawls, on the display unit 151. The terminal 100 can obtain an input of selecting the baby from the displayed video 1320. The terminal 100 can display a region indicator 1337 corresponding to the baby that is an object corresponding to the obtained input. The controller 180 can recognize the baby corresponding to the obtained input and separate the region corresponding to the selected baby from the image 1320. The terminal 100 can obtain an input of moving the baby that is the selected object. For example, the terminal 100 can receive an input of dragging the region included in the region indicator 1337. In response to the input of moving the region, the terminal 100 can display a video in which the region corresponding to the baby moves. Hence, the terminal 100 can play the video in which the region corresponding to the baby separated from the displayed image 1320 moves.

The terminal 100 according to various embodiments can recognize an object contained in an outputted content and obtain motion model information corresponding to the recognized object. And, based on the obtained motion model information, the terminal 100 can play a video having the recognized object move therein. This is described as follows.

Figure 14:
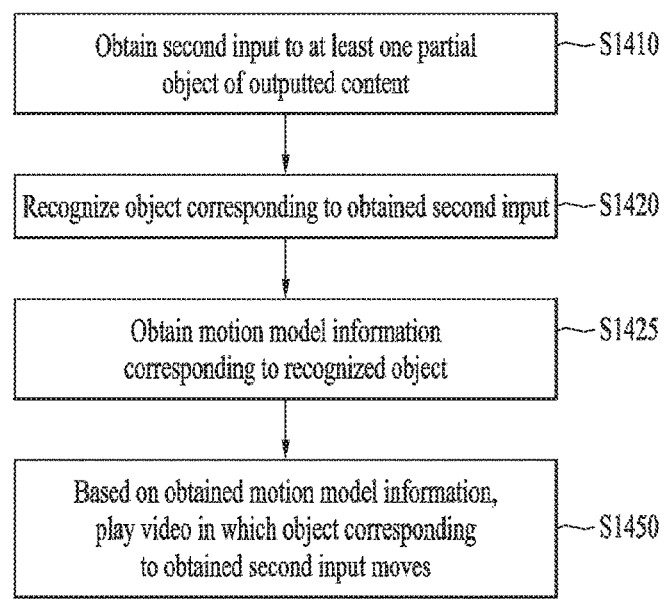
FIG. 14 is a flowchart for a motion video play operation according to various embodiments of the present invention.

FIG. 14 is a flowchart for a motion video play operation according to various embodiments of the present invention.

Referring to FIG. 14, the terminal 100 can obtain a second input to at least one partial object of an outputted content [S1410].

For example, the terminal 100 can output a content to the display unit 151 and obtain a second input to at least one partial object of the outputted content. Herein, the second input may include an input of selecting a partial region or object of the outputted content. And, the input of selecting the partial region or object of the outputted content may include at least one of various touch inputs.

The terminal 100 can recognize an object corresponding to the obtained second input [S1420].

For example, the controller 180 can recognize a region corresponding to the object selected from the outputted content. Hence, the controller 180 can recognize the object corresponding to the obtained second input. For one embodiment, the controller 180 can obtain the second input of selecting a partial region of the object from the outputted content and recognize the object corresponding to the selected partial region.

When the terminal 100 recognize the object, it can recognize at least one of a structure, frame and connection relation of the object. For example, if the recognized object is a human body, the controller 180 can recognize such a connection relation as a human body structure, human body frame and joint.

And, the terminal 100 may recognize the structure, the frame, the connection relation and the like of the recognized object on a schematic level. Hence, according to performance, settings, user settings and the like of the terminal, the terminal 100 can differently process recognition levels of the structure, the frame, the connection relation and the like of the recognized object.

Moreover, when the terminal 100 recognizes an object, it can recognize a part connected to the selected object and a part separated from the selected object. For example, the terminal 100 can separate a background and an object in a content from each other. For another example, if a selected object is a part of a human body, the terminal 100 can recognize a whole human body including the selected object.

The terminal 100 can obtain motion model information corresponding to the recognized object [S1425].

The controller 180 of the terminal 100 can obtain the motion model information corresponding to the object corresponding to the obtained second input. Herein, the motion model information may include information for calculating and predicting a motion of the corresponding object.

The controller 180 can obtain the motion model information corresponding to the recognized object from a motion model database stored in the memory 170 or may receive the motion model information from a communication-connected external server or device.

For example, the controller 180 can receive the motion model information for the recognized object from at least one of the memory 170, the external server and the external device. Moreover, the controller 180 may obtain a motion model for the recognized object through a user selection from a motion model information list.

Moreover, based on a plurality of frames or images of the content, the terminal 100 may obtain a motion model of the object included in the content. For example, based on a plurality of frames or images of the content, the terminal 100 can determine a motion of the recognized object and obtain a motion model of the recognized object based on the determined motion. Particularly, based on a plurality of frames or images of the content, the terminal 100 can determine a motion extent and a motion range (e.g., vibration number, motion width, etc.) of the recognized object and determine another object moving together with the recognized object or an object moving differently from the recognized object.

Based on the obtained motion model information, the terminal 100 can play a video in which an object corresponding to the obtained second input moves [S1450].

Based on the obtained motion model information, the controller 180 of the terminal 100 can play a video in which the object corresponding to the obtained second input moves. Hence, the terminal 100 can play a video in which the object corresponding to the second input in the content moves only or a video in which a plurality of objects including the object corresponding to the second input moves.

The controller 180 of the terminal 100 can obtain an input for a motion of the object and play a video corresponding to the obtained input for the motion based on the motion model information. For example, based on the obtained motion model information, the controller 180 can play a video according to an input of shifting the object and play a video according to an input of moving the object.

For example, if the selected object is a prescribed body part, the controller 180 can play a video, in which the prescribed body part moves, based on the obtained body motion model information. Hence, the terminal can play a video, in which the prescribed body part moves, in consideration of a direction and range for moving a body joint and the like. Moreover, based on the obtained body motion model information, the terminal 100 can play a video, in which a prescribed body part moves, in consideration of a part that is movable together with the prescribed body part if the prescribed body part moves.

Meanwhile, according to a video play, the terminal may output a video, in which at least one partial region moves, to the display unit 151 of the terminal 100 and output an audio corresponding to the outputted video through the audio output module 152. And, the terminal 100 may deliver a signal for a played video to an external device. Hence, having received the delivered signal, the external device may output a video in which at least one partial region of a content moves. The terminal 100 may save the outputted video, in which at least one partial region of a content moves, to the memory 180 or send the video to save to an external server or device.

Described in the following is a video playing operation on the basis of motion model information of the present invention described based on a detailed embodiment.

Figure 15:
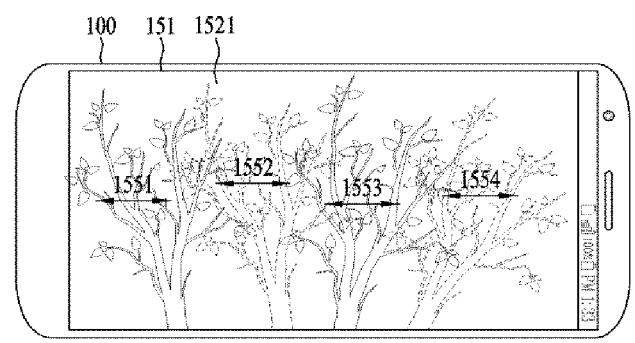
FIG. 15 is a diagram showing one example of obtaining motion model information according to various embodiments of the present invention.

FIG. 15 is a diagram showing one example of obtaining motion model information according to various embodiments of the present invention.

Referring to FIG. 15, the terminal 100 can display a tree swaying video 1521 on the display unit 151. Herein, the tree swaying video 1521 displayed by the terminal 100 may include a content configured with a plurality of frames or images. Based on a plurality of the frames or images included in the displayed video 1521, the controller 180 can determine a motion level of swaying branches and a motion range of the swaying branches. For example, based on a plurality of the frames or images included in the displayed video 1521, the controller 180 can determine a frequency of the swaying branches, a motion width of the swaying branches. Moreover, based on a plurality of the frames or images included in the displayed video 1521, the controller 180 can determine an independently moving object and an object moving together. For one embodiment, based on a plurality of the frames or images included in the displayed video 1521, the controller 180 can determine a motion 1551 of a first branch, a motion 1552 of a second branch, a motion 1553 of a third branch and a motion 1554 of a fourth branch, respectively. And, based on the determined motions 1551 to 1554, the controller 180 can obtain motion model information of the branches included in the video 1521.

Figure 16:
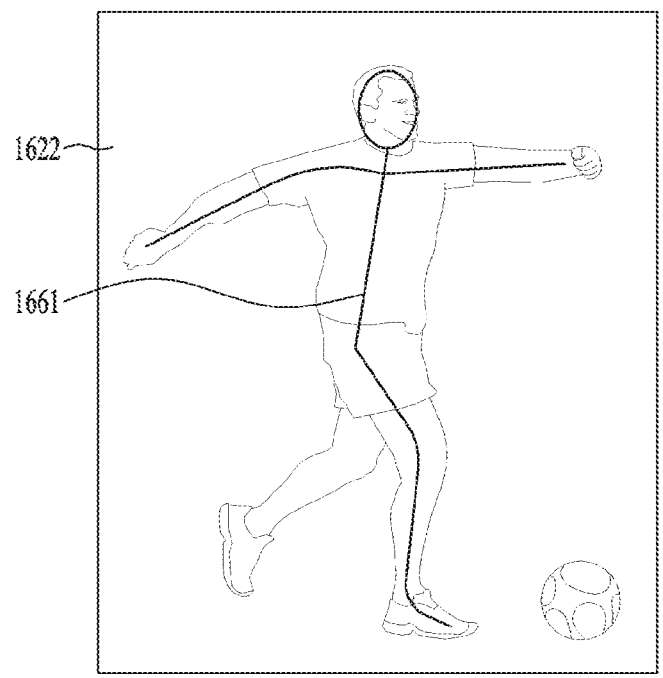
FIG. 16 is a diagram of the concept for body frame structure recognition according to various embodiments of the present invention.
Figure 16:
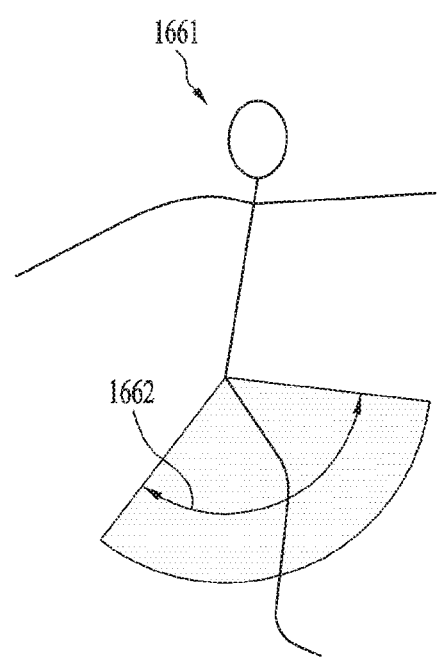

FIG. 16 is a diagram of the concept for body frame structure recognition according to various embodiments of the present invention.

The terminal can recognize a body of a man from an image 1622. And, the terminal 100 can recognize a body frame structure 1661 of the recognized body. For example, the controller 180 of the terminal 100 recognizes the body from the image 1622 and is then able to recognize a schematic body frame structure 1661 of the recognized body. The controller 180 can respectively recognize bones and joints from the recognized body frame structure 1661 and determine a detailed body part. Based on the determined body part, the controller 180 can determine a movable range according to the recognized body frame structure 1661. For example, based on the body frame structure 1661 of a character included in the image 1622, the controller 180 can determine a movable range 1662 in which a right foot of the character can move.

Figure 17:
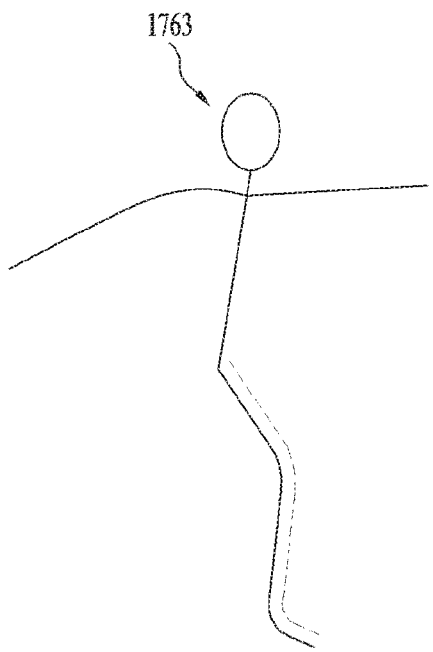
FIG. 17 is a diagram of the concept for a movable action according to various embodiments of the present invention.
Figure 17:
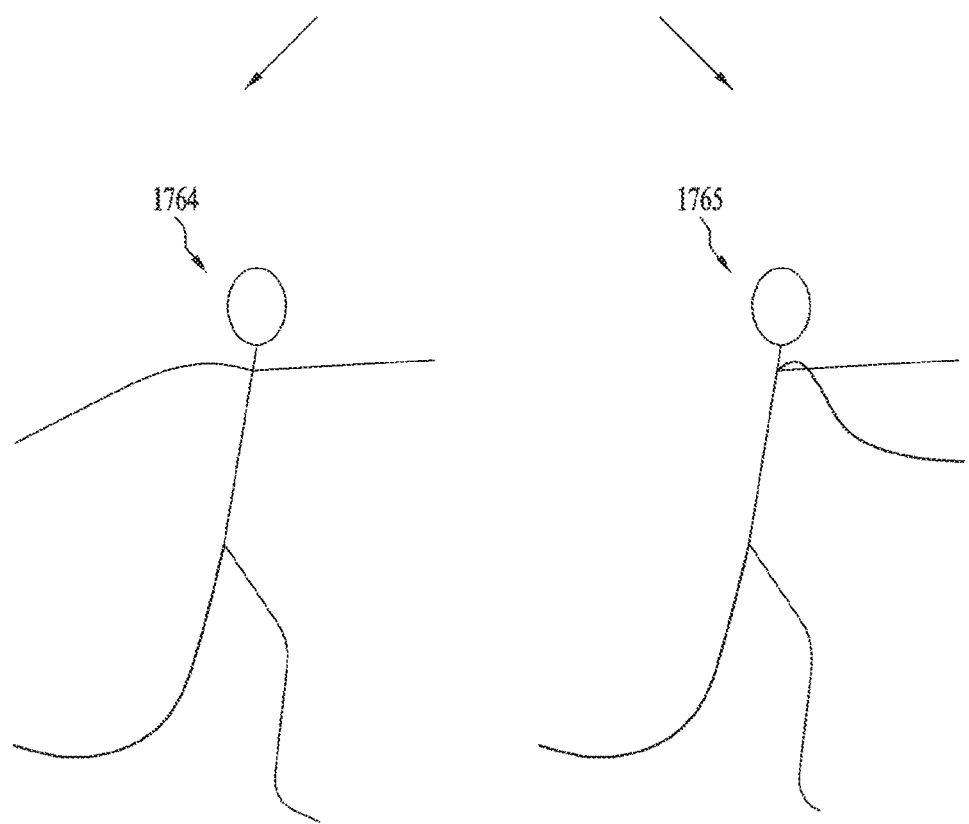

FIG. 17 is a diagram of the concept for a movable action according to various embodiments of the present invention.

Referring to FIG. 17 (*a*), a body frame structure 1763 recognized by the terminal 100 on the basis of an image, as described in FIG. 16, is illustrated. Based on the recognized body frame structure 1763, the terminal 100 can determine an operable body action. And, the terminal 100 can play a video moving according to the operable body action. Referring to FIG. 17 (*b*), based on the recognized body frame structure 1763, the terminal 100 can determine an operable body action. Herein, the body frame structure 1763 may include motion model information including the aforementioned movable range, the determined body part and the like. For example, based on the recognized body frame structure 1763, the terminal 100 can determine a left foot moving action 1764. And, the terminal 100 can determine an action 1765 of both arms moving together according to the left foot moving action 1764. Herein, based on the motion model information on a body motion, the terminal 100 can determine an action of another body part according to the left foot moving action. Based on the determined actions 1764 and 1765, the terminal 100 can play a moving image for the left foot moving action.

Figure 18:
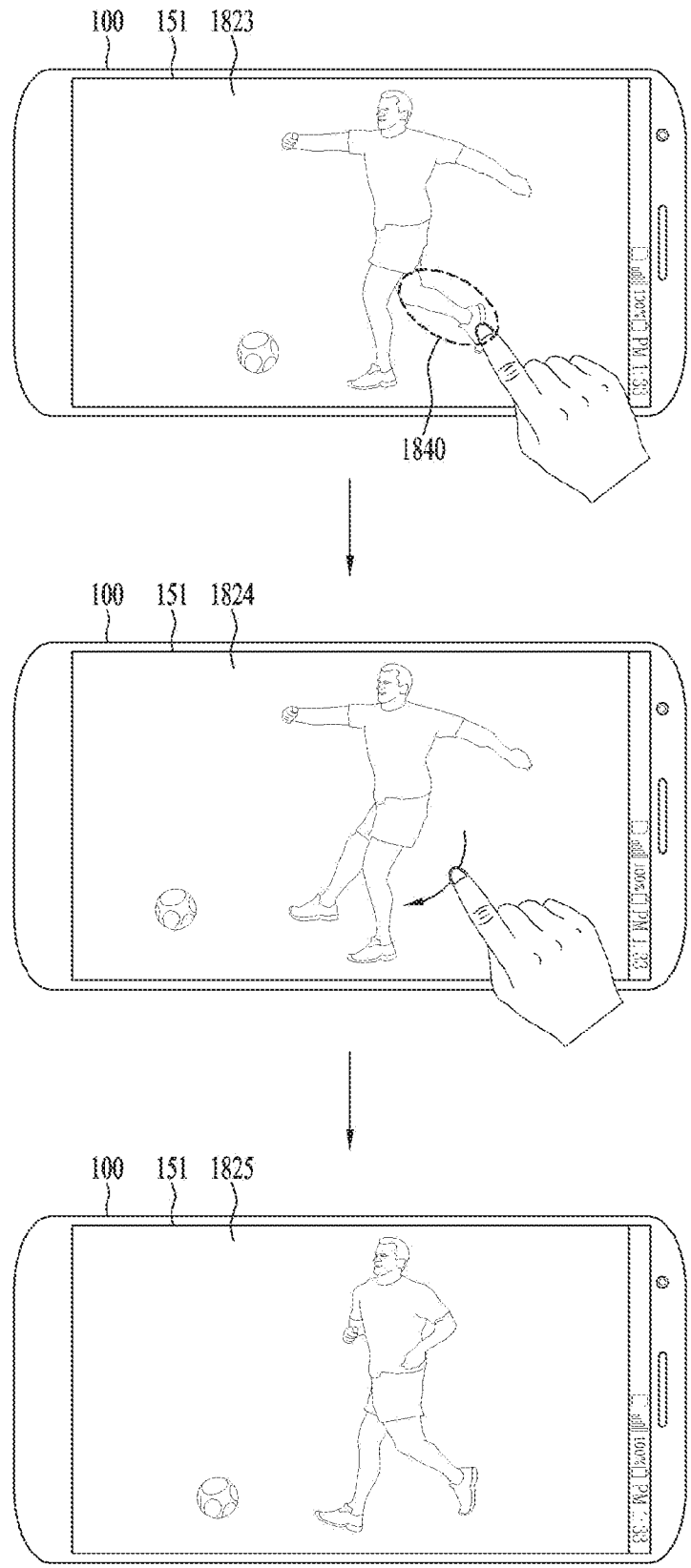
FIG. 18 is a diagram showing one example of a video moving in response to a second input according to various embodiments of the present invention.

FIG. 18 is a diagram showing one example of a video moving in response to a second input according to various embodiments of the present invention.

Referring to FIG. 18, the terminal 100 can output a video 1823, in which a soccer player dribbles, to the display unit 151. The terminal 100 can obtain an input of selecting a left leg of the soccer player from the displayed video 1823. Herein, the video 1823 may include a paused video or a played video. The terminal 100 can display a region indicator 1840 on a region corresponding to a region of the selected left leg and recognize an object within the region indicator 1840. The terminal 100 can recognize a whole body of the soccer player as well as the left leg that is the recognized object. The terminal 100 can recognize a body frame structure of the soccer player and determine a movable region. The terminal 100 can obtain an input of moving the selected left leg in the displayed video 1823. Hence, based on the recognized body frame structure and the determined movable region, the terminal 100 can play a video 1824 in which the left leg moves according to the obtained input. And, based on the recognized body frame structure and the determined movable region, the terminal 100 can play a video 1825 in which another body part moves according to the movement of the left leg. For example, terminal 100 can play the video 1825 in which both arms and a right leg move according to the movement of the left leg. Thus, the terminal 100 can recognize a body frame structure, determine a movable region, and play a video in which a prescribed body part moves according to an input.

Figure 19:
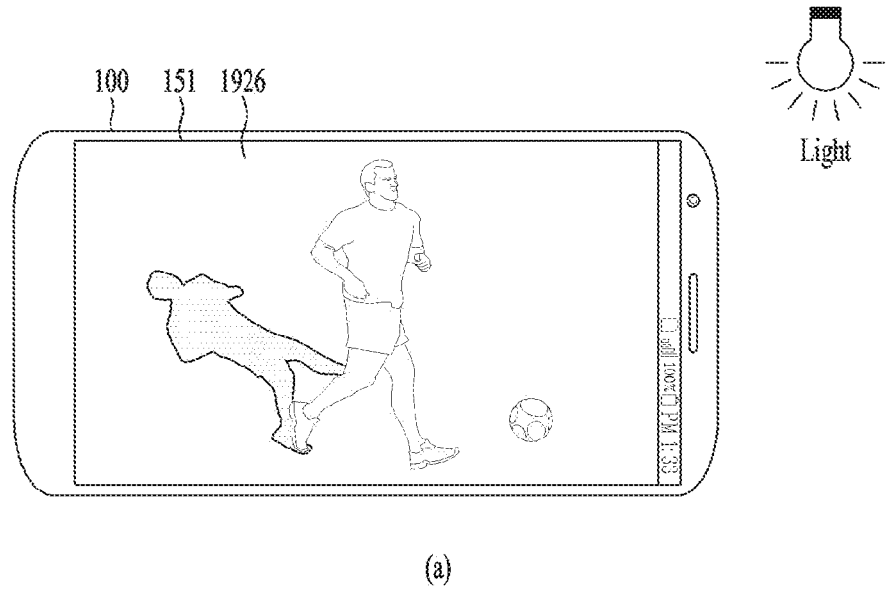
FIG. 19 is a diagram showing one example of a video depending on a light source location according to various embodiments of the present invention.
Figure 19:
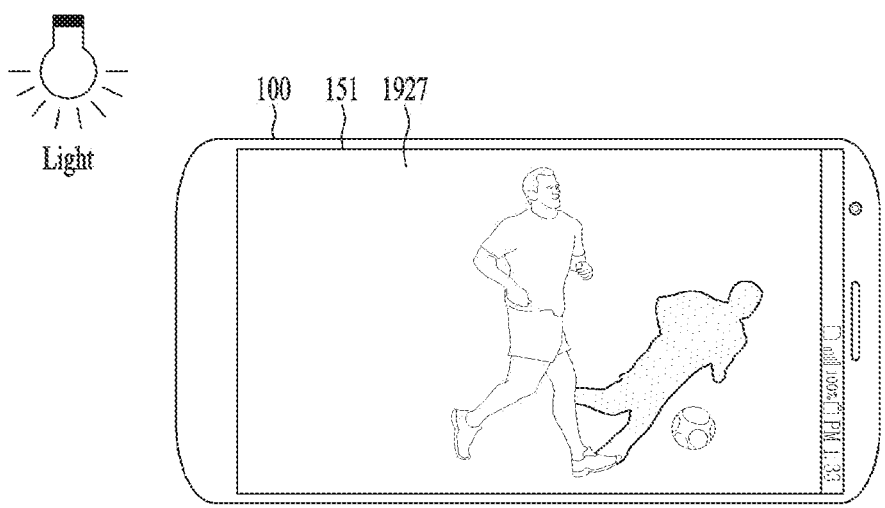

FIG. 19 is a diagram showing one example of a video depending on a light source location according to various embodiments of the present invention.

Referring to FIG. 19 (*a*), the terminal 100 can display an image 1926 for a person who is playing ball on the display unit 151. The terminal 100 can recognize the person included in the image 1926 and also recognize a shadow depending on a light source. Based on ambient environment information and light source model information, the terminal 100 can change a location of the shadow for the person included in the image 1926. For example, if an illumination is located at an upper-right end of the terminal 100, the terminal 100 can display the image 1926 in which a shadow for the person included in the image 1926 appears on a left side of the person. If a location of the illumination is changed, the terminal 100 can change the image to correspond to the changed illumination location. For example, as shown in FIG. 19 (*b*), the terminal 100 can recognize the illumination location shifted to left and display an image 1927, in which a shadow of a person is displayed on a right side of the person, on the display unit 151. Thus, the terminal 100 can play an image or video for an object included in a content according to object recognition and ambient environment information.

The terminal 100 according to various embodiments can receive a selection of motion model information for an object included in a content and play a moving video of the object included in the content based on the selected motion model information. For example, if failing to recognize an object included in a content, the terminal 100 may receive a selection of at least one motion model information from the aforementioned motion model information and play a video, in which the object included in the content moves, based on the selected motion model information. For one embodiment, the terminal 100 can obtain an input of selecting motion model information for an object included in a content from a motion model information list and play a video, in which the object included in the content moves, based on the selected motion model information. This is described with reference to FIG. 20.

Figure 20:
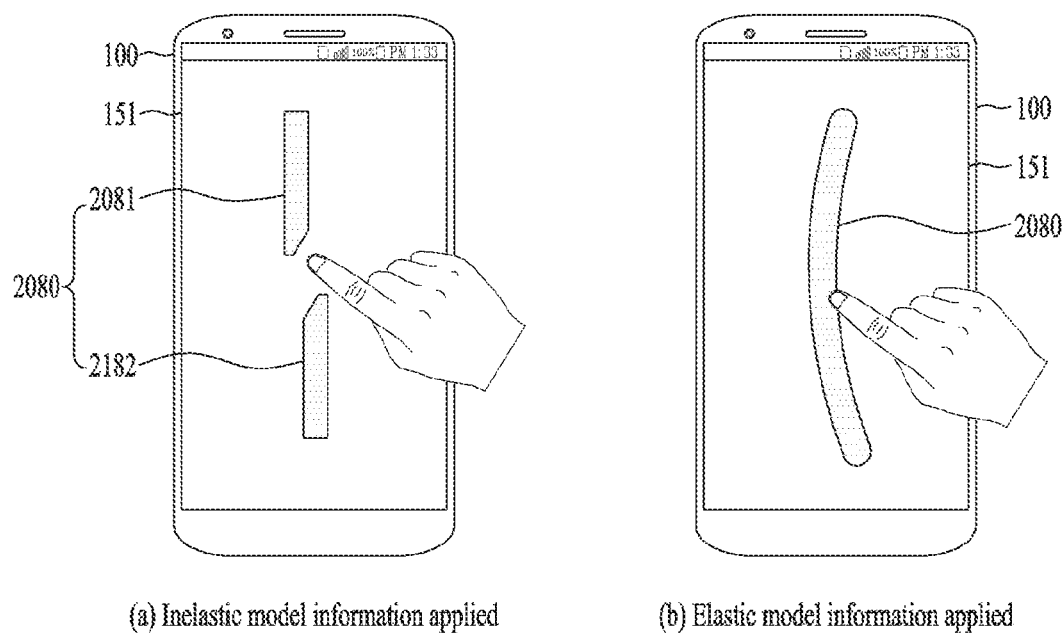
FIG. 20 is a diagram showing one example of applying selected motion model information according to various embodiments of the present invention.

FIG. 20 is a diagram showing one example of applying selected motion model information according to various embodiments of the present invention.

Referring to FIG. 20 (*a*), the terminal 100 can receive a selection of an inelastic model as a motion model for a bar 2080 displayed on the display unit 151 and obtain information of the selected inelastic model. In this case, the inelastic model information may mean a motion model for material or property of inelasticity or low elasticity like tree, plastic and the like. The terminal 100 can obtain an input of pressing the bar 2080 having the inelastic model information applied thereto. Based on the inelastic model information, if the pressing input is equal to or greater than a predetermined value, the terminal 100 can play a video in which the bar 2080 is broken. Hence, the terminal 100 can play a video in which the bar 2080 is broken into a top part 2081 and a bottom part 2082.

Referring to FIG. 20 (b), the terminal 100 can receive a selection of an elastic model as a motion model for a bar 2080 displayed on the display unit 151 and obtain information of the selected elastic model. In this case, the elastic model information may mean a motion model for material or property of high elasticity like rubber. The terminal 100 can obtain an input of pressing the bar 2080 having the elastic model information applied thereto. Based on the elastic model information, if the pressing input is equal to or greater than a predetermined value, the terminal 100 can play a video in which the bar 2080 is broken. Hence, the terminal 100 can play a video in which the bar 2080 bends in response to the pressing input.

Thus, the terminal 100 can receive a selection of motion model information for an object included in a content and play a video in which the object included in the content moves by applying the selected motion model information. And, the terminal 100 can save the video in which the obtained included in the content moves.

Meanwhile, when a moving video is played, since the played video can be outputted or displayed, an operation of playing a video, in which at least one partial region of the content moves, can include an operation of playing or outputting the video having the at least one partial region move therein. Therefore, for clarity of the description, the substance describing that a terminal according to various embodiments of the present invention plays a video in which at least one partial region of a content moves may refer to the description of an operation that the terminal outputs or displays the video in which the at least one partial region of the content moves.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A terminal, comprising:
a touchscreen configured to display a content; and
a controller configured to:
   recognize a touch input received via a region of a first content displayed on the touchscreen;
   cause the touchscreen to display a second content, which comprises a first video, in response to the recognized touch input, a region of the second content moving when the first video is played;
   play the first video at a play speed corresponding to an input strength of the touch input when the second content is displayed;
   obtain a second video including an area around the terminal through a camera of the terminal;
   recognize a location of a subject included in the second video; and
   play the first video in which the region of the second content moves toward the location of the subject.

2. The terminal of claim 1, wherein the controller is further configured to play the first video in which the region of the second content moves according to a play direction corresponding to a direction of the touch input.

3. The terminal of claim 2, wherein the controller is further configured to:
   play the first video such that the region of the second content moves forward when the direction of the touch input is a first direction; and
   play the first video such that the region of the second content moves backward when the direction of the touch input is a second direction.

4. The terminal of claim 1, wherein the controller recognizes an object corresponding to the obtained input, obtains motion model information corresponding to the recognized object, and controls the display unit to output a video having the recognized object move therein based on the obtained motion model information.

5. The terminal of claim 4, wherein the controller obtains an input of selecting the motion model information corresponding to the recognized object from a plurality of motion model informations and obtains the selected motion model information.

6. The terminal of claim 4, wherein if the recognized object is a prescribed body part, the controller recognizes a frame structure of a body included in the content and controls the display unit to output a video, in which at least one portion of the recognized body moves, based on the recognized frame structure.

7. The terminal of claim 6, wherein the controller determines a movable region for moving at least one portion of the recognized body based on the recognized frame structure and controls the display unit to output a video in which the at least one portion of the recognized body moves within the determined movable region.

8. The terminal of claim 1, wherein the controller obtains ambient environment information on an ambience environment of the terminal and controls the display unit to output a video having at least one partial region of the content move therein based on the obtained ambient environment information.

9. The terminal of claim 1, further comprising:
a memory, and
wherein the controller is further configured to cause the memory to store the played first video.

10. A method of controlling a terminal, the method comprising:
- displaying, on a touchscreen, a content;
- recognizing a touch input received via a region of a first content displayed on the touchscreen;
- displaying a second content, which comprises a first video, on the touchscreen in response to the recognized touch input, a region of the second content moving when the first video is played;
- playing the first video at a play speed corresponding to an input strength of the touch input when the second content is displayed;
- obtaining a second video including an area around the terminal through a camera of the terminal;
- recognizing a location of a subject included in the second video; and
- playing the first video in which the region of the second content moves toward the location of the subject.

11. The method of claim 10, wherein when the first video is played, the region of the second content moves according to a play direction corresponding to a direction of the touch input.

12. The method of claim 11, wherein the playing the first video comprises:
- when the direction of the touch input is a first direction, playing the first video such that the region of the second content moves forward; and
- when the direction of the touch input is a second direction, playing the first video such that the region of the second content moves backward.

13. The method of claim 10, further comprising:
- recognizing an object corresponding to the obtained input; and
- obtaining motion model information corresponding to the recognized object,
- wherein the outputting comprises outputting a video having the recognized object move therein based on the obtained motion model information.

14. The method of claim 13, the obtaining, comprising:
- obtaining an input of selecting the motion model information corresponding to the recognized object from a plurality of motion model informations; and
- obtaining the selected motion model information.

15. The method of claim 13, wherein the recognizing comprises if the recognized object is a prescribed body part, recognizing a frame structure of a body included in the content and wherein the outputting comprises outputting a video, in which at least one portion of the recognized body moves, based on the recognized frame structure.

16. The method of claim 15, the outputting, comprising:
- determining a movable region for moving at least one portion of the recognized body based on the recognized frame structure; and
- outputting a video in which the at least one portion of the recognized body moves within the determined movable region.

17. The method of claim 10, further comprising obtaining ambient environment information on an ambience environment of the terminal, wherein the outputting comprises outputting a video having at least one partial region of the content move therein based on the obtained ambient environment information.

18. The method of claim 10, further comprising storing the played first video to a memory of the terminal.

* * * * *